United States Patent [19]
Contreras

[11] 3,958,345
[45] May 25, 1976

[54] LANGUAGE INSTRUCTION DEVICE

[76] Inventor: Amelia Contreras, 300 W. 55th St., New York, N.Y. 10019

[22] Filed: Mar. 17, 1975

[21] Appl. No.: 559,222

[52] U.S. Cl. .............................................. 35/35 H
[51] Int. Cl.² ............................................ G09B 1/06
[58] Field of Search ........................ 35/35 H, 35 J; 273/136 D, 136 K

[56] References Cited
UNITED STATES PATENTS

| | | | |
|---|---|---|---|
| 834,494 | 10/1906 | Sanborn | 273/136 K |
| 3,464,124 | 9/1969 | Lynd | 35/35 H |
| 3,665,618 | 5/1972 | Hahn | 35/35 H |

FOREIGN PATENTS OR APPLICATIONS

| | | | |
|---|---|---|---|
| 840,663 | 6/1952 | Germany | 273/136 D |

*Primary Examiner*—Wm. H. Grieb

[57] ABSTRACT

A language instructing device comprising a board containing squares with frequently used syllables forming words in the language and playing pieces bearing corresponding verbal indicia. The board is provided with marginally open ended slots for containing the pieces and especially designed covers to assure their relative security when the device is not in use.

1 Claim, 2 Drawing Figures

LANGUAGE INSTRUCTION DEVICE

The present invention relates to game boards and the like and in particular to such board having areas containing indicia associative with that appearing on corresponding playing pieces.

The present invention contemplates a language teaching device employed in the manner of a game to afford practice in identifying syllables of words on oral or other command and associating them correctly by matching playing pieces and squares on a board. The pieces are stored in open ended, lateral niches for quick withdrawal at the time a syllable is heard by the players whereby the written form of the syllable assuming its recognition may be quickly withdrawn and used to cover a corresponding or the identical form of the syllable appearing on one of the squares provided by the board surface.

One object of the invention is to provide a new and improved language teaching device.

Figure 1:
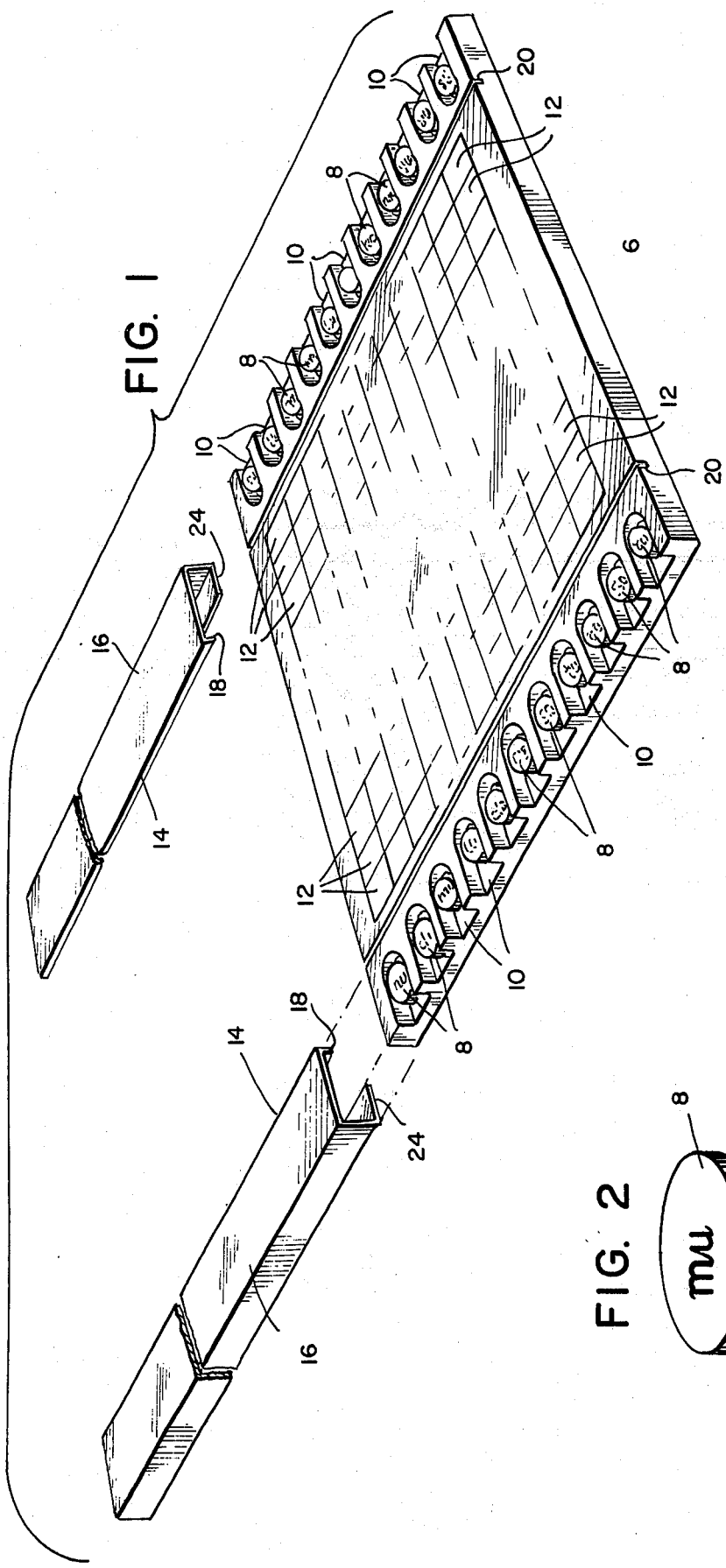
Figure 2:
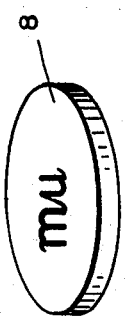

Other objects and advantages of the invention may be appreciated on reading the following description of one embodiment thereof which is taken in conjunction with the accompanying drawings, in which FIG. 1 is a perspective view of the game board; and FIG. 2 is a view showing one of the playing pieces.

Referring to the drawings, it is seen that the language teaching comprises two principal components namely, game board 6 and cardboard playing pieces 8. At each end of the board there is provided a plurality of open ended niches 10 which contain one or more of the pieces that may be individually withdrawn therefrom both conveniently and expeditiously by sliding through the open marginal end of its niche.

There is prepared on the top surface of the board 6 contiguous squares 12 each bearing a common syllable of the language the device is designed to teach. Associative syllables are inscribed on face of pieces 8 and one object of game may be to match corresponding syllables on the pieces and the board after hearing it pronounced. With two persons playing the game and striving to cover the most number of squares in the quickest manner, the reason for the special design of the open ended niches may be appreciated.

A cover 14 is provided for insuring the security and preservation of the pieces within the niches when the game board is not in use. The cover is U-shaped with the top leg 16 covering the niches and having a tongue 18 depending from the far end thereof. A groove 20 formed in the board adjacent the niches is adapted to receive the tongue 18 which together with the opposed leg 24 of the cover bearing on the underside of the board serve to hold the cover in place.

Various modifications of the invention may be effected by persons skilled in the art without departing from the scope and principle thereof as defined in the appended claims.

What is claimed is:

1. A language instruction type device comprising a board having marginal, open ended niches formed in its upper surface, play pieces contained in said niches, said pieces having language indicia inscribed thereon, said board having a playing surface formed of a plurality of squares, a slidable cover being provided for said niches, said cover having a portion bearing against the under surface of said board and a second portion covering said niches in the upper surface thereof, a groove formed in said upper surface and a tongue secured to said second portion of the cover adapted to be received in said groove, said groove being provided beyond the playing surface of the board whereby said surface is completely exposed when said cover is secured in said groove.

* * * * *